United States Patent
Takahashi

(10) Patent No.: US 11,673,056 B2
(45) Date of Patent: Jun. 13, 2023

(54) COMPUTER SYSTEM, SERVER SYSTEM, AND GAME SYSTEM

(71) Applicant: BANDAI NAMCO Entertainment Inc., Tokyo (JP)

(72) Inventor: Toru Takahashi, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 73 days.

(21) Appl. No.: 17/216,950

(22) Filed: Mar. 30, 2021

(65) Prior Publication Data

US 2021/0299572 A1 Sep. 30, 2021

(30) Foreign Application Priority Data

Mar. 31, 2020 (JP) .............................. JP2020-063343

(51) Int. Cl.
| | | |
|---|---|---|
| A63F 13/69 | (2014.01) | |
| A63F 13/85 | (2014.01) | |
| A63F 13/798 | (2014.01) | |

(52) U.S. Cl.
CPC ............ *A63F 13/69* (2014.09); *A63F 13/798* (2014.09); *A63F 13/85* (2014.09); *A63F 2300/609* (2013.01); *A63F 2300/61* (2013.01)

(58) Field of Classification Search
CPC ....................................................... A63F 13/69
See application file for complete search history.

(56) References Cited

U.S. PATENT DOCUMENTS

| | | | | |
|---|---|---|---|---|
| 9,272,208 | B1* | 3/2016 | LeTourneau | A63F 13/45 |
| 9,675,889 | B2* | 6/2017 | Lai | A63F 13/33 |
| 10,286,298 | B1* | 5/2019 | Koh | A63F 13/35 |
| 2008/0194337 | A1* | 8/2008 | Hensel | F41A 33/00 |
| | | | | 463/52 |
| 2009/0017913 | A1* | 1/2009 | Bell | A63F 13/46 |
| | | | | 463/40 |
| 2017/0326456 | A1* | 11/2017 | Kawaguchi | A63F 13/792 |
| 2018/0361248 | A1* | 12/2018 | Nomura | A63F 13/847 |
| 2019/0282903 | A1* | 9/2019 | Brody | A63F 13/5375 |

FOREIGN PATENT DOCUMENTS

JP 2017-113438 A 6/2017

OTHER PUBLICATIONS

Pokemon GO wiki, Mar. 26, 2019, available at https://pokemongo.fandom.com/wiki/Pok%C3%A9mon_Eggs?oldid=45143 (Year: 2019).*

* cited by examiner

*Primary Examiner* — Jay Trent Liddle
(74) *Attorney, Agent, or Firm* — Posz Law Group, PLC

(57) ABSTRACT

A computer system gives an object to a player who has satisfied a given game condition in a game in which a plurality of players participate. The computer system gives a given prize to an owner player having the object when the owner player has satisfied a given prize giving condition. In the case where an owner player lost in a competition between the owner player and another player, the computer system confiscates an object from the owner player, thereby turning the owner player to a non-owner player, and turning another player to a new owner player.

18 Claims, 17 Drawing Sheets

[PRIZE ITEM CHANGE②]

[OWNER PLAYER]

| PRIZE ITEM SETTING TABLE (CHANGE CONDITION = STATE OF WINNING COMPETITION) | |
|---|---|
| REMAINING PHYSICAL POWER AT THE END OF COMPETITION | PRIZE ITEM |
| 0～5[%] | RANK=1 (SMALLEST) |
| 5～10[%] | RANK=2 |
| 10～15[%] | RANK=3 |
| ⋮ | ⋮ (TO GREATEST RANK Tm) |

323b

[PRIZE ITEM CHANGE③]

[OWNER PLAYER]

| PRIZE ITEM SETTING TABLE (CHANGE CONDITION =OWNERSHIP PERIOD LENGTH) | 323c |
|---|---|
| OWNERSHIP PERIOD LENGTH (MINUTES) | PRIZE ITEM |
| 0〜5 | RANK=1 (SMALLEST) |
| 5〜10 | RANK=2 |
| 10〜15 | RANK=3 |
| ⋮ | ⋮ (TO GREATEST RANK Sm) |

FIG.13

| [GIVING OBJECT SETTING TABLE] | |
|---|---|
| PLAYER LEVEL | GIVEN OBJECT (TYPE OF EGG) |
| 1〜5 | α1 |
| 6〜10 | β1 |
| 11〜15 | γ1 |
| ⋮ | ⋮ |

330

COMPUTER SYSTEM, SERVER SYSTEM, AND GAME SYSTEM

CROSS REFERENCE TO RELATED APPLICATION

This application is based upon and claims the benefit of priority to Japanese Patent Application No. 2020-063343 filed on Mar. 31, 2020, the entire contents of which are incorporated herein by reference.

BACKGROUND

Various techniques to increase the excitement of a game in which a plurality of players participate have been proposed. For example, in a competition game in which players compete against each other, there is a known technique for generating a scramble for an auxiliary object that can be exchanged for a special item. More specifically, this technique stochastically generates a special competition game having a special rule, gives an auxiliary object to the winner, and carries out another special competition game to compete with the winner for the auxiliary object (for example, see JP2017-113438A).

BRIEF DESCRIPTION OF THE DRAWINGS

FIG. 13 is an example of giving object setting table.

DESCRIPTION OF EXEMPLARY EMBODIMENTS

Figure 1:
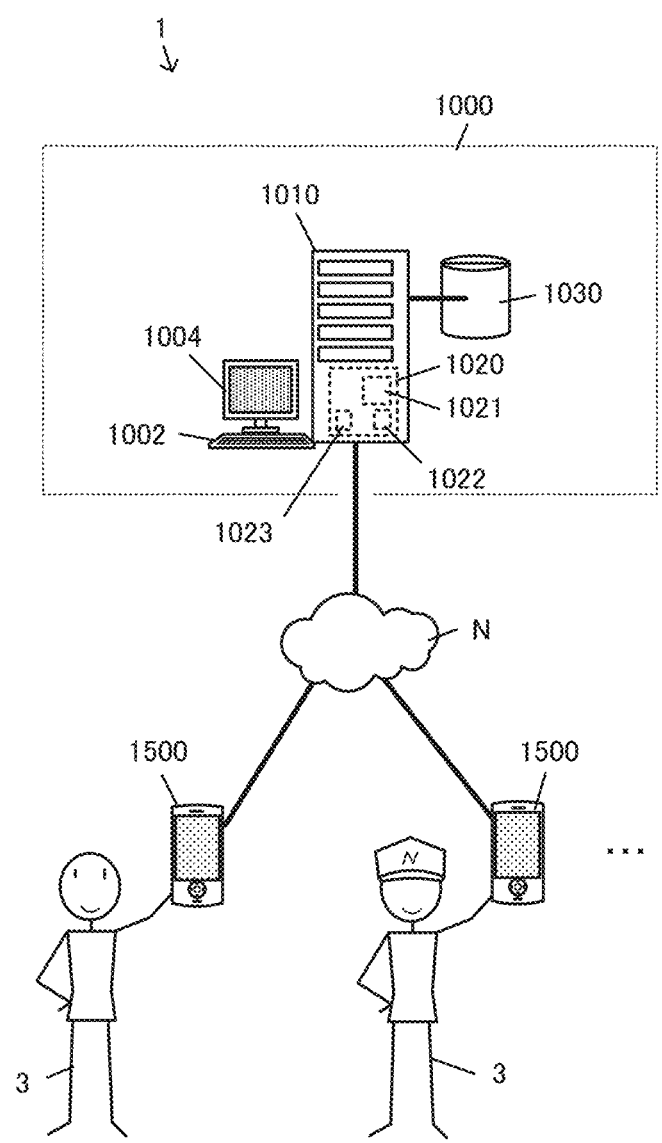
FIG. 1 is a diagram showing a structure of a game system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a computer system comprising: at least one processor or circuit programmed to:
give an object to a player who has satisfied a given game condition;
give a given prize to an owner player having the object when the owner player has satisfied a given prize giving condition; and
confiscate the object from the owner player when an act between the owner player and another player satisfies a confiscation condition and turn the another player to a new owner player.

According to the first disclosure, it is possible to further enhance the amusement of games in which multiple players participate. More specifically, if an act between an owner player of an object and another player satisfies the confiscation condition, the object is confiscated from the owner player and another player becomes the new owner player. As a result, since the confiscation condition is defeat of the owner player, for example, in a competition game in which an act between the owner player and another player is a competition, it is possible to achieve a new technology that can enhance amusement of a game by making these players to fight for the object.

A second disclosure is the computer system, wherein giving the prize comprises variably controlling a prize item to be given to the owner player.

According to the second disclosure, a prize item to be given to the owner player is variably controlled. Specifically, the owner player of the object is given a prize when a prize giving condition is satisfied, and the prize item varies. This is a good fun for the player because he/she will be excited thinking what kind of prize is given, thereby further enhancing amusement of the game.

A third disclosure is the computer system, wherein controlling the prize item comprises variably controlling the prize item based on a play history of the owner player while the confiscation condition is not satisfied.

According to the third disclosure, the prize item given to the owner player is variably controlled based on a play history of the owner player while the confiscation condition is not satisfied. As a result, the player can be given new excitement such that his/her play history after becoming an owner player is reflected in the prize item, thereby further enhancing amusement of the game.

A fourth disclosure is the computer system, wherein the play history includes the number of acts not satisfying the confiscation condition.

According to the fourth disclosure, the prize item given to the owner player is variably controlled based on the number of times when the act between the owner player and another player does not satisfy the confiscation condition. As a result, by changing the prize item so that higher number of competitions of the owner player gives the owner player a more "valuable" or "advantageous" prize item, for example, in a competition game, it is possible to motivate the owner player to have more competitions with other players, thereby further enhancing amusement of the game.

A fifth disclosure is the computer system, wherein the play history includes a state of the act when the act does not satisfy the confiscation condition.

According to the fifth disclosure, the prize item given to the owner player is variably controlled based on the state when the act between the owner player and another player did not satisfy the confiscation condition. For example, in a competition game, the "state of act" may be a victory state such as whether it was overwhelming victory or slim victory, how to win the competition such as which weapon, protection, technique, etc. was used, the time required for the competition, and the like. As a result, for example, it is possible to give further excitement in a competition game, such as devising a method of competition to obtain a desired prize item.

A sixth disclosure is the computer system, wherein the play history includes a length of a period in which the confiscation condition is not satisfied.

According to the sixth disclosure, the prize item given to the owner player is variably controlled based on the length of the period while the confiscation condition is not satisfied. As a result, by changing the prize item so that, the longer the period length, more "valuable" or "advantageous" prize item for the owner player is given, for example, in a competition game, it is possible to motivate the owner player to win competitions with other players to keep the object as long as possible, thereby further enhancing amusement of the game.

A seventh disclosure is the computer system, wherein the play history includes frequency of the act.

According to the seventh disclosure, the prize item given to the owner player is variably controlled based on the frequency of the act between the owner player and another player. As a result, by changing the prize item so that higher frequency gives a more "valuable" or "advantageous" prize item for the owner player, for example, in a competition game, it is possible to motivate the owner player to have competitions with other players more frequently, thereby further enhancing amusement of the game.

An eighth disclosure is the computer system, wherein controlling the prize item includes variably controlling the prize item based on a parameter value of the owner player at the time of the object being given after the game condition is satisfied.

According to the eighth disclosure, the prize item given to the owner player is variably controlled based on the parameter value of the owner player at the time of the game condition being satisfied and an object being given. Specifically, if the parameter value of the player is set to a value that can vary in accordance with the game progress such as a level or experience point, the prize item may vary depending on the time when the game condition is satisfied. Further, if the parameter value of the player is set to a value that does not vary according to the game progress such as occupation or attribute, the prize item may vary depending on the player regardless of the game progress.

A ninth disclosure is the computer system, wherein the at least one processor or circuit is further programmed to reset change control for the prize item when the prize is given to the owner player after the prize giving condition is satisfied.

According to the ninth disclosure, change control for the prize item is reset when the prize is given to the owner player who has satisfied the prize giving condition.

A tenth disclosure is the computer system, wherein giving the prize comprises giving the prize by regarding satisfying the confiscation condition as satisfying the prize giving condition.

According to the tenth disclosure, when the confiscation condition is satisfied and the object of the owner player is confiscated, the player is given a prize. As a result, it is possible to give a prize for the previous ownership of the object.

An eleventh disclosure is the computer system, wherein controlling the prize item comprises variably controlling the prize item based on a parameter value of the owner player and/or a parameter value of the another player at the time of the act satisfying the confiscation condition.

According to the eleventh disclosure, the prize item is variably controlled based on the parameter value of the another player and/or the owner player at the time of the act between the owner player and the another player satisfies the confiscation condition. The parameter value of the player is, for example, a level, an experience point, a physical strength value, possessed items, an occupation, an attribute, and the like. As a result, by changing the prize item so that greater level difference between the players gives the owner player a more "valuable" or "advantageous" prize item, for example, in a competition game, it is possible to motivate the player to compete with an experienced player, thereby further enhancing amusement of the game.

A twelfth disclosure is the computer system, wherein confiscating comprises confiscating the object from the owner player and turning the owner player to a non-owner player when the prize is given.

According to the twelfth disclosure, when a prize is given to the owner player, the object is confiscated, and the owner player becomes a non-owner player. Accordingly, the player will not receive a prize if he/she wants to keep owning the object.

A thirteenth disclosure is the computer system, wherein the at least one processor or circuit is further programmed to
    perform a control for presenting the prize item to the owner player.

According to the thirteenth disclosure, the content of the prize item is presented to the owner player. As a result, the owner player knows how the prize item will vary, and, for example, if the prize item is variably controlled based on the play history of the owner player, the owner player can play the gameplay while trying to obtain a desired prize item by checking the presented prize item, thereby giving a new excitement.

A fourteenth disclosure is the computer system, wherein the at least one processor or circuit is further programmed to
    control at least one of the game conditions, the prize giving condition, and the confiscation condition.

According to the fourteenth disclosure, at least one of the game conditions, the prize giving condition, and the confiscation condition is variably controlled.

A fifteenth disclosure is the computer system, wherein the at least one processor or circuit is further programmed to
    control presenting at least one of the game conditions, the prize giving condition, and the confiscation condition to players participating in the game.

According to the fifteenth disclosure, at least one of the game conditions, the prize giving condition, and the confiscation condition is presented to the players participating in the game. As a result, the players participating in the game can play the game in consideration of the presented conditions, and will play the game in a way of obtaining an object, obtaining a prize, preventing an object from being confiscated, and the like, thereby further enhancing amusement of the game.

A sixteenth disclosure is the computer system, wherein the at least one processor or circuit is further programmed to
    control matching of a player participating in the game; and
    control for identifiable display of the owner player upon the matching when the participating player is the owner player.

According to the sixteenth disclosure, the owner player is identifiably displayed upon the matching of the participating players. This allows the participating players to know which of the other players is the owner player of the object; as a result, for example, in a competition game, a competition between the owner player and other players will be facilitated, thereby increasing the sense of tension in the game.

A seventeenth disclosure is the server system, which is the computer system for performing communication with player terminals.

An eighteenth disclosure is the game system comprising a player terminal and the server system.

Exemplary embodiments are described below. Note that the following exemplary embodiments do not in any way limit the scope of the content defined by the claims laid out herein. Note also that all of the elements described in the present embodiment should not necessarily be taken as essential elements.

A preferred embodiment of the present disclosure is explained below with reference to the drawings. However, it is clear that the embodiment described below does not in any way limit the scope of the present disclosure, and the mode to which the present disclosure is applicable is not limited to the following embodiment. In the descriptions of drawings, the same element is given the same reference number.

Game System

FIG. 1 is a diagram illustrating an example of a structure of a game system according to the present embodiment. According to FIG. 1, a game system 1 of the present embodiment includes a server system 1000 that can connect to a communication network N, and a plurality of player terminals 1500 that connect to the server system 1000 via the communication network N, and thereby are capable of communication with the server system 1000.

The communication network N refers to a communication channel that enables data communications. Specifically, the communication network N includes a communication network such as a local area network (LAN) using a private line (a private cable) for direct connection, Ethernet (registered trademark), or the like, a telecommunication network, a cable network, the Internet, and the like. A communication method may be a cable communication method or a wireless communication method.

The server system 1000 is a computer system including a main body device 1010, a keyboard 1002, a display 1004, and a storage 1030, and the main body device 1010 includes a control board 1020.

The control board 1020 includes various microprocessors such as a Central Processing Unit (CPU) 1021, a Graphics Processing Unit (GPU), and a Digital Signal Processor (DSP), various types of IC memory 1022 such as VRAM, RAM, or ROM, and a communication device 1023.

The control board 1020 may be entirely or partially implemented by an Application Specific Integrated Circuit (ASIC), a Field-Programmable Gate Array (FPGA), or a System on a Chip (SoC). These arithmetic circuits may also be regarded as processors. The server system 1000 actuates various types of service for operating the game of the present embodiment by allowing the control board 1020 to carry out a calculation process based on a predetermined program and data. For example, the server system 1000 actuates a player management function related to player registration and a game management function for managing an execution control of a game in the player terminal 1500. That is, the game in the present embodiment is performed as a kind of client-server online game.

The server system 1000 is not limited to the single structure shown in FIG. 1, but may be configured by including a plurality of blade servers that are connected together via an internal bus in a data communicable manner to share the functions. The server system 1000 may also be configured such that a plurality of independent servers installed at distant places perform data communication via a communication line to thereby function as a server system 1000 as a whole.

The player terminal 1500 is a computer system that is individually used by a player 3 to play a game, and is an electronic apparatus (an electronic device) that can access the server system 1000 via the communication network N. The player terminal 1500 of the present embodiment is, as a hardware, described as a device known as a smartphone. However, the player terminal 1500 may also be a portable game device, a game controller, a personal computer, a tablet computer, a wearable computer, or the like. Further, the player terminal 1500 is not limited to the single device shown in FIG. 1, but may be configured such that a plurality of devices cooperate to function integrally.

Description of Game

1. Outline

The game played in the game system 1 is a multiplayer online competition game, and is a battle royale game (also called a survival game) in which each player operates his/her own player character while watching the game image based on the player character and repeats battles with player characters of other players until the end of the game.

Figure 2:
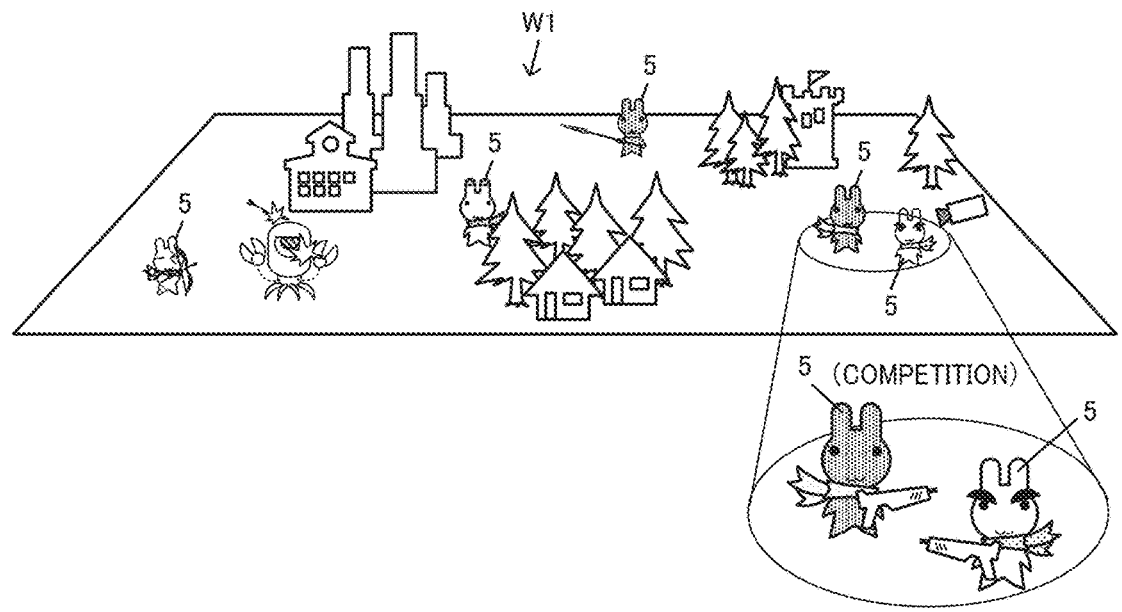
FIG. 2 is an explanatory view of a game.
Figure 2:
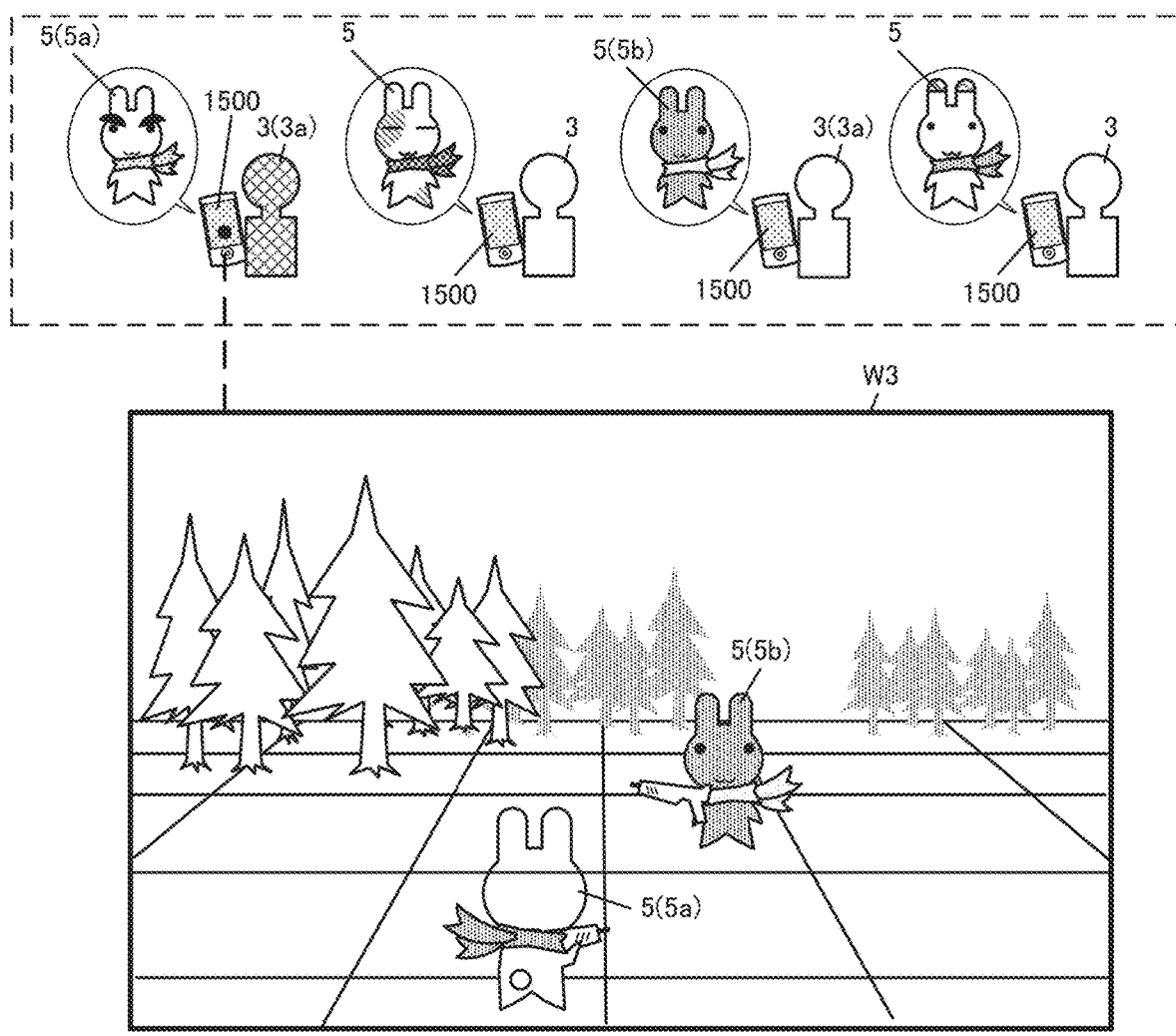

FIG. 2 is a diagram for showing an outline of a game of the present embodiment. As shown in FIG. 2, in the game of the present embodiment, player characters 5 corresponding to the individual predetermined maximum number of participating players 3 are arranged in a game space W1 configured as a virtual three-dimensional space. The participating players 3 are selected, for example, by matching based on the level of the players 3. In the player terminal 1500 owned by each participating player 3, a game image W3, which is an image of the game space W1 from the perspective of the player character 5 of the player 3, is displayed. The player 3 operates his/her own player character 5 and plays the game by repeating battles with player characters 5 of other players 3 while watching the game image W3.

A competition means an act in which two players 3 operate their own player characters 5 to attack each other, thereby determining the victory or defeat (winning and losing). Defeat is a state in which an action of a player 3 becomes inactive because his/her damage received by the attack of another player 3 exceeds the predetermined damage amount. The amount of damage received by the attack is determined by parameter values related to the ability of both player characters 5, their weapons, protections, or the like. The player character 5 of the player 3 who lost the competition is left inactive in the game space W1, or disappears from the game space W1. As a result, the player 3 who lost the competition cannot play thereafter until the end of the game. The game continues until there is only one player left, and only the last player 3 becomes the winner of the game. In addition, the game may be a time-limited battle royale game in which the player 3 who survived until the predetermined time has elapsed becomes the winner.

2. Features

In the game of the present embodiment, an object is given to a player who has satisfied a given game condition, and when an owner player who owns the object has satisfied a given prize giving condition, the given player is granted a given prize.

Figure 3:
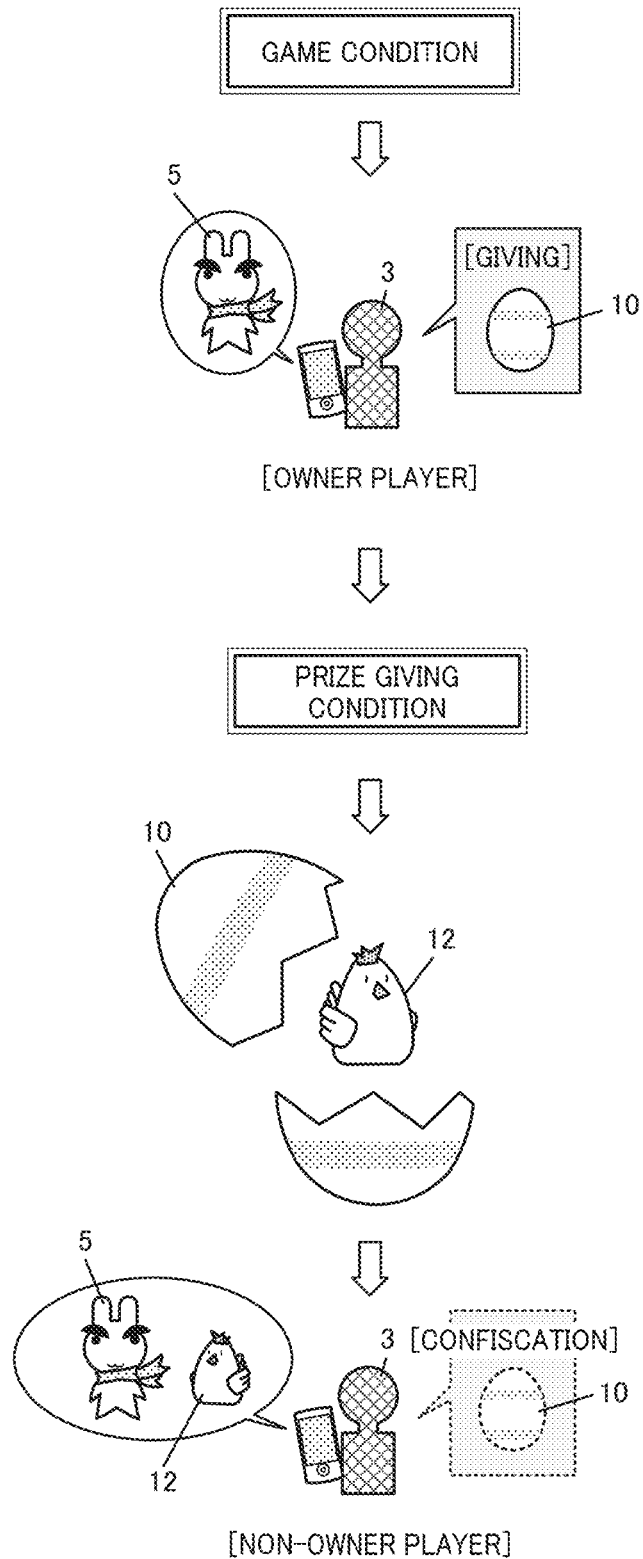
FIG. 3 is an explanatory view of an object and a prize.

More specifically, as shown in FIG. 3, an egg 10 is given as an object to the player 3 who satisfied a given game condition. The player 3 becomes the owner player who owns the object. Then, when the owner player satisfies a given prize giving condition, the owner player is granted a sub character 12 as a prize. The sub character 12 is an attendant character that appears in the game thereafter, stays with the player 3, who is the master, and automatically performs actions useful for the game progress. The condition for receiving the sub character 12 which is the prize giving condition may be, for example, a manual condition of the owner player, such as a predetermined instruction operation input by the owner player, or other conditions such as when the object ownership period exceeds a predetermined period, when the victory exceeds a predetermined number of consecutive wins, or when a predetermined item is used, and the like. When the sub character 12 as a prize is given, a special effect in which the egg 10 as the object is broken and the sub character 12 appears from the egg is performed. By granting a prize, the object owned by the owner player (the egg 10 in this case) is confiscated and disappears, and the owner player becomes a non-owner player who does not own the object.

The game condition for granting an object may be, for example, the frequency of participation in the game, the total game playing time, the number of wins in the competitions with other players, use of predetermined items, or the like, or may also be a condition on the game progress such as an act of discovering an object hidden in a predetermined position in the game space. In addition, it is possible to decide whether or not to grant the object with a predetermined probability at the predetermined timing such as upon the victory of the competition.

It may also be arranged such that, if the act between the owner player and another player satisfies the confiscation condition for confiscating the object from the owner player, the object is confiscated from the owner player, and the owner player is turned to a non-owner player and the another player becomes the new owner player.

Figure 4:
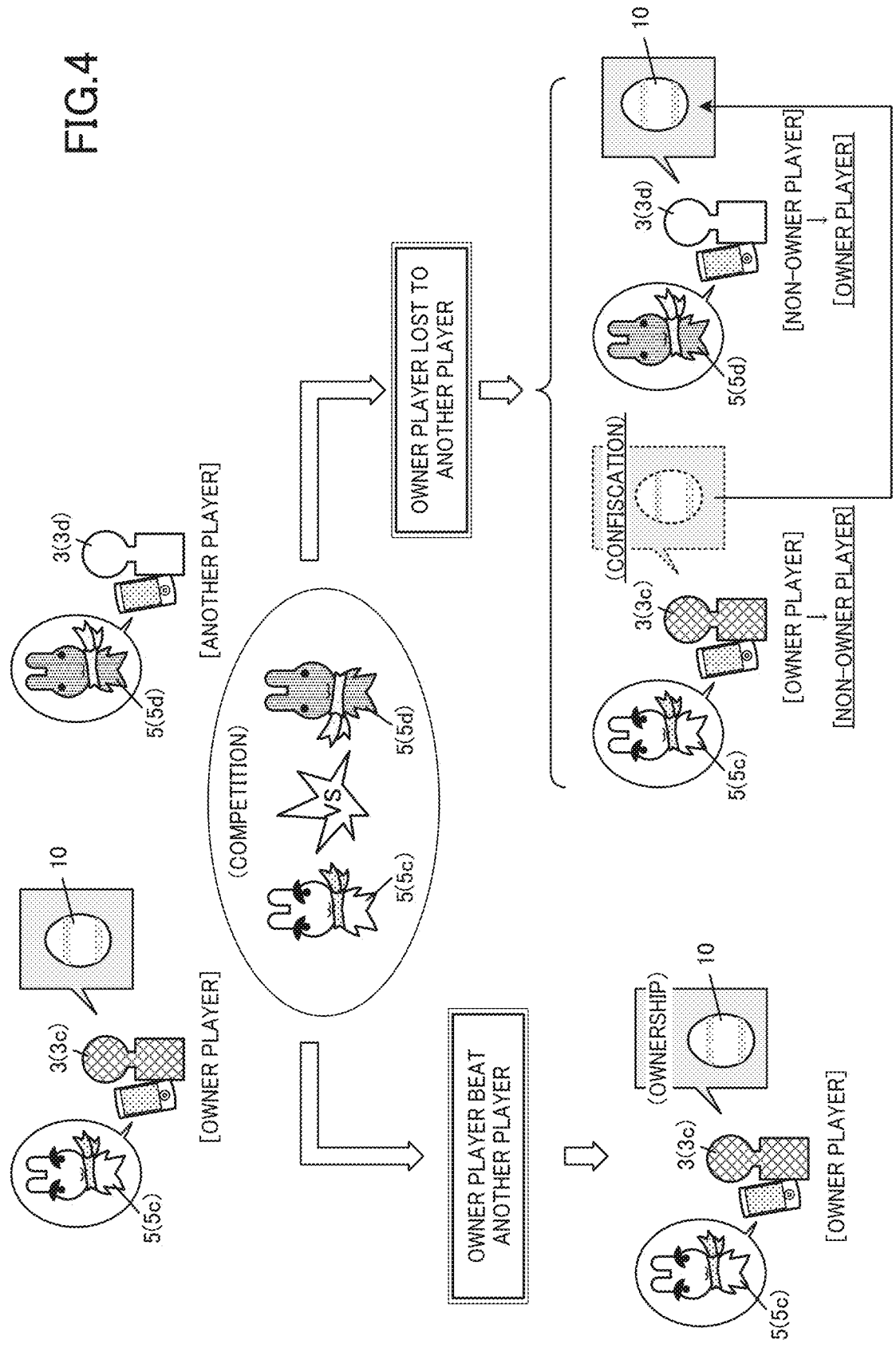
FIG. 4 is an explanatory view of confiscation of object as a result of a competition.

Specifically, as shown in FIG. 4, when the player character 5c of the owner player 3c and another player character 5d of another player 3d compete, if the owner player 3c is defeated by another player 3d, the object owned by the owner player 3c is confiscated and the owner player 3c becomes a non-owner player, and another player 3d owns the object and becomes a new owner player. When the object of the owner player is confiscated and another player become a new owner player, a special effect in which another player takes away the object from the previous owner player is performed. The confiscation condition is defeat of the owner player by another player. In contrast, if the owner player 3c defeats another player 3d, the owner player 3c continues to own the object and remains the owner player.

In addition, the prize item given to the owner player is variably controlled based on the play history of the owner player while the confiscation condition is not satisfied. The play history includes the number of acts not satisfying the confiscation condition, the state of the act not satisfying the confiscation condition, the length of the period before the confiscation condition was satisfied, and the frequency of the act.

Figure 5:
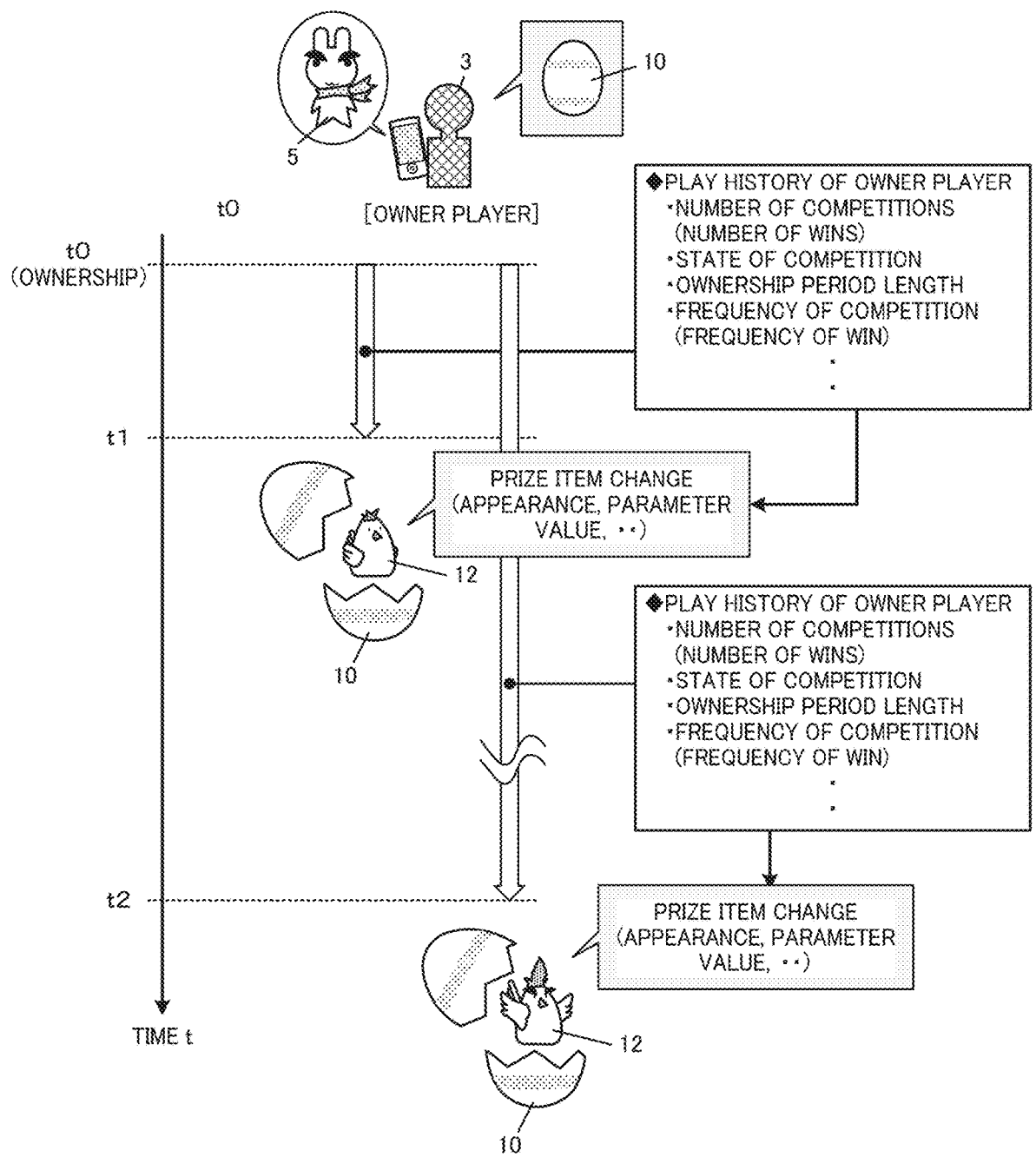
FIG. 5 is an explanatory view of change control for prize items.

Specifically, as shown in FIG. 5, the sub character 12 with different parameter values regarding appearance and game progress is given as a prize in accordance with the play history of the owner player. It can be regarded that a different sub character 12 is given. In the present embodiment, the act between the owner player and another player is a competition, and the confiscation condition is defeat of the owner player by another player in the competition. Therefore, the period in which the confiscation condition is not satisfied means a period in which the owner player remains the owner player, and the owner player keeps winning in the competition with other players.

Therefore, in the present embodiment as a battle royale game, the number of competitions (i.e., the number of wins) can be regarded as the number of the acts not satisfying the confiscation condition. The state of the competition is the state of the act not satisfying the confiscation condition. Examples of the state of the competition include the time required for the competition with another player, the amount of damage done to another player, and the remaining power (remaining physical strength value, or the like) of the user's own player at the time of victory. The period length in which the confiscation condition is not satisfied means an ownership period length corresponding to the elapsed time from the time t0, which is the point of start of the owner player. The frequency of the act is, for example, frequency of competition (may also be regarded as frequency of win), which is the number of competitions (number of wins) per unit time obtained by dividing the number of competitions (number of wins) by the ownership period length.

In the present embodiment, the prize change control is performed depending on what sub character 12 is virtually present in the object and what type of the sub character 12 is set. Specifically, the sub character 12, which is the prize, is variably controlled based on the parameter value of the ownership parameter when the game conditions is satisfied and the object is given. More specifically, multiple types of eggs 10 are prepared as the object, and each type of the egg 10 is associated with a different type of sub character 12, which is the prize. Furthermore, each type of the egg 10 is associated with a condition of the parameter value of the owner player, and is also associated with a different change condition for variably controlling the prize item. The parameter value of the owner player includes, for example, a level of the player (indicating the gameplay experience and skill), an attribute, an occupation, and the like. In other words, the type of the egg 10 given as an object and the type of the sub character 12 given as a prize are determined in accordance with the parameter value of the owner player when the game condition is satisfied and the object is given, and the appearance and the parameter value of the sub character 12 change according to the play history of the owner player.

Figure 6:
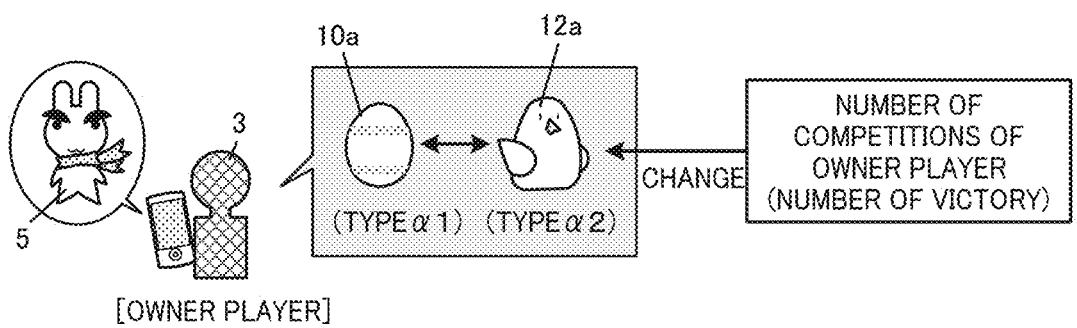
FIG. 6 is an explanatory view of change control for prize items.
Figure 7:
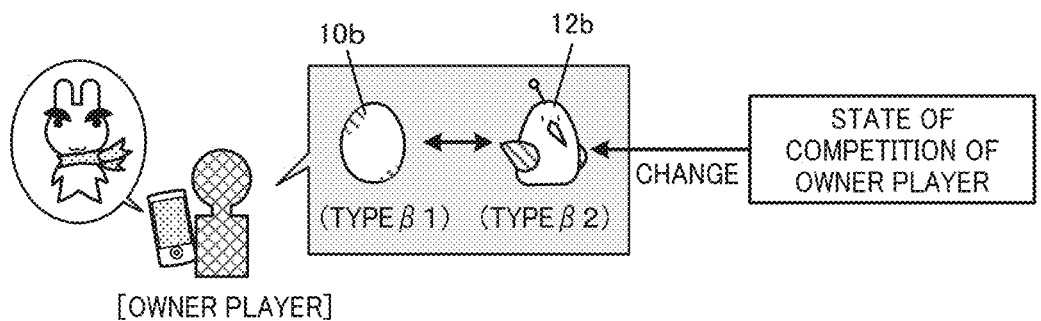
FIG. 7 is an explanatory view of change control for prize items.
Figure 8:
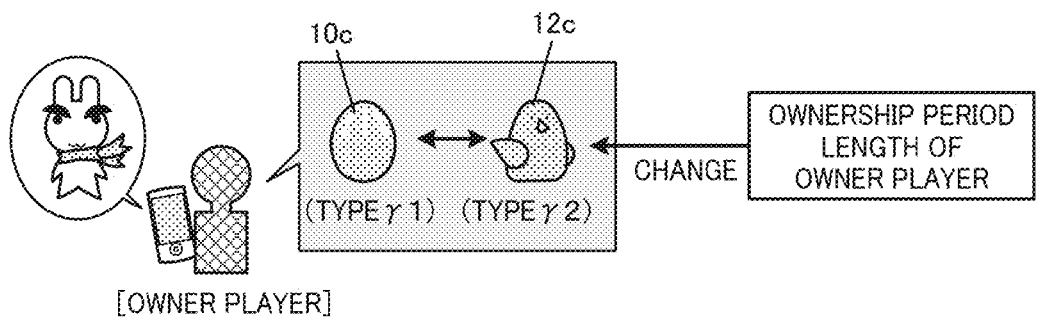
FIG. 8 is an explanatory view of change control for prize items.

FIG. 6 to FIG. 8 show examples of change control for prize items. In FIG. 6, the egg 10a (object) of type α1 is associated with the sub character 12a (prize) of type α2, and the appearance and parameter value of the sub character 12a, which is the prize item, change depending on the number of competitions (number of wins), which is a play history of the owner player. The change control for prize item is performed in accordance with a prize item setting table 323a. The prize item setting table 323a defines the number of competitions (number of wins), which is the change condition, while associating it with the appearance and the parameter value of the sub character 12a, which is the prize item. The prize item setting table 323a in FIG. 6 defines the conditions such that greater number of competitions (number of wins) provides a stronger appearance or a higher parameter value, etc. That is, the player is given a "valuable" or "advantageous" prize item that helps the game progress. This will motivate the owner player to compete with more players.

In FIG. 7, the egg 10*b* (object) of type 81 is associated with the sub character 12*b* (prize) of type 62, and the appearance and parameter value of the sub character 12*b*, which is the prize item, change depending on the state of competition, which is a play history of the owner player. The change control for prize item is performed in accordance with a prize item setting table 323*b*. The prize item setting table 323*b* defines the state of competition, which is the change condition, while associating it with the appearance and the parameter value of the sub character 12*b*, which is the prize item. Although the state of competition is set to the remaining physical strength value of the owner player at the end of competition in the prize item setting table 323*b* of FIG. 7, a different state of condition may also be used. Since a greater remaining physical strength value means more overwhelming victory, it is set that the player is given a "valuable" or "advantageous" prize item that helps the game progress, such as a stronger appearance or a higher parameter value. This will motivate the owner player to have a competition with other players in a way of achieving more overwhelming victories. It is also possible to set the prize item setting table 323*b* such that, the smaller the ability difference in the competition (the smaller remaining physical strength value), the winning player is given a stronger appearance or a higher parameter value, i.e., a "valuable" or "advantageous" prize item that helps the game progress.

In FIG. 8, the egg 10*c* (object) of type γ1 is associated with the sub character 12*c* (prize) of type γ2, and the appearance and parameter value of the sub character 12*c*, which is the prize item, change depending on the ownership period length, which is a play history of the owner player. The change control for prize item is performed in accordance with a prize item setting table 323*c*. The prize item setting table 323*c* defines the ownership period length, which is the change condition, while associating it with the appearance and the parameter value of the sub character 12*c*, which is the prize item. The prize item setting table 323*c* in FIG. 8 defines the conditions such that longer ownership period length provides a stronger appearance or a higher parameter value, etc. That is, the player is given a "valuable" or "advantageous" prize item that helps the game progress. This will motivate the owner player to continue such an undefeated (i.e., winning) competition with the other players so that the owner player keeps the object for a longer period of time.

The change control for prize items may also be performed in a different manner. For example, to perform a change control of a prize item based on the frequency of competition (frequency of win), the prize item setting table 323 may be set so that higher frequency of competition gives a more "valuable" or "advantageous" prize item. The frequency of competition is calculated from both the ownership period length and the number of competitions. For example, if the ownership period length is long despite a small number of competitions, the frequency of competition becomes small, and it can be regarded that the player is avoiding competitions to continue to possess the prize. In contrast, even if the ownership period length is the same, higher number of competitions provides a higher frequency of competition. Therefore, higher frequency of competition gives a more "valuable" or "advantageous" prize item, and it is possible to motivate the owner player to have more competitions. Further, the confiscation condition may include a condition of decreasing a frequency to or below a predetermined value (i.e., low frequency of competition); in this case, the object will be confiscated from the owner player if the frequency of competition of the owner player falls to or below a predetermined frequency. It is also possible to, before the confiscation, give a notice that the object will be confiscated if the owner player will keep avoiding competitions for a certain period of time. The case where the frequency of competition is low means, for example, a case where the ownership period is long despite a small number of competitions. This may be regarded that the owner player is avoiding the competitions with other players to continue to possess the prize. By providing a prior notice before the confiscation or actually performing confiscation, it is possible to motivate such an owner player to perform competitions with other players.

Functional Structure
1: Server System

Figure 9:
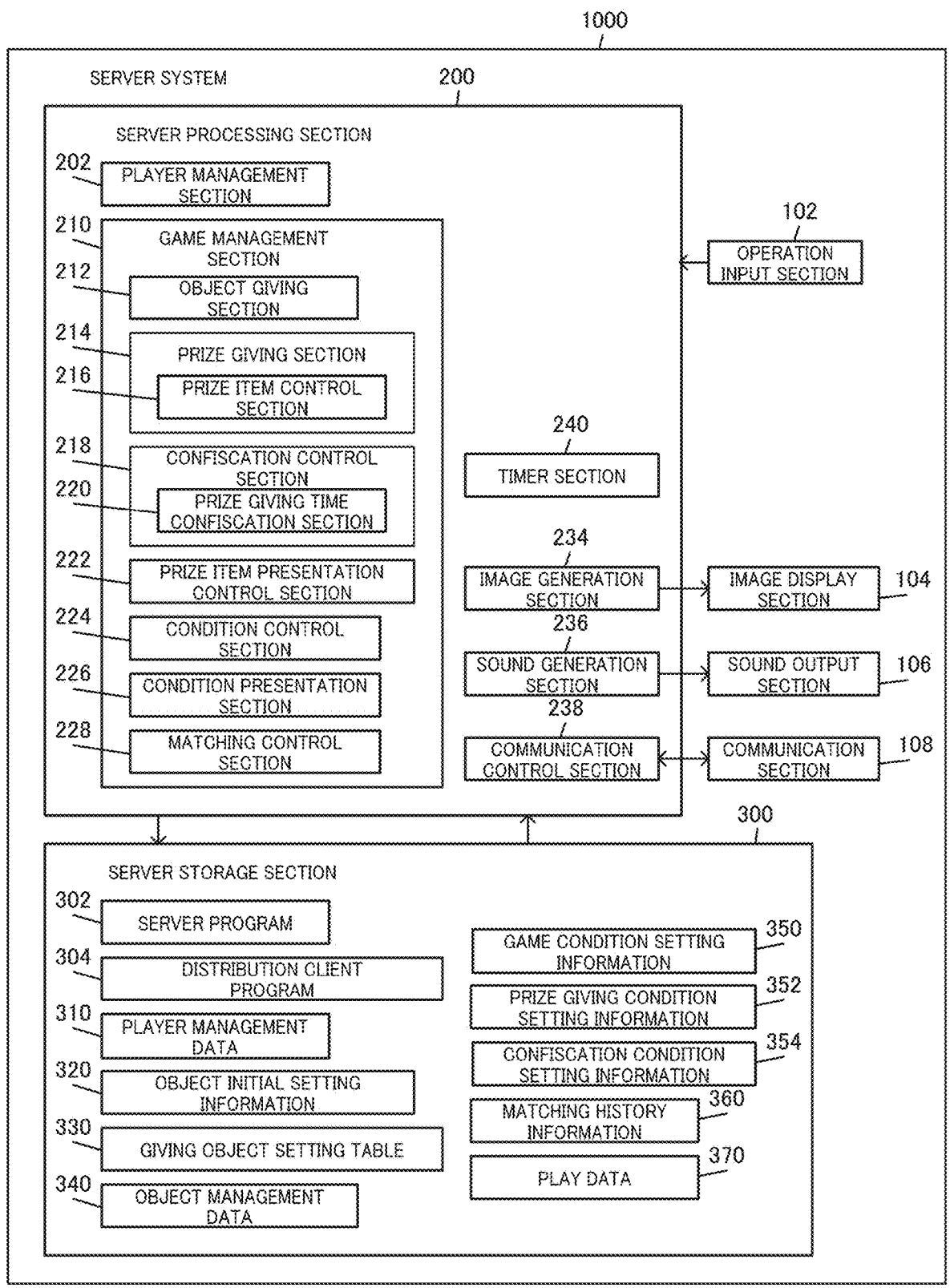
FIG. 9 is a diagram showing a functional structure of a server system.

FIG. 9 is a functional block diagram illustrating a functional configuration of the server system 1000. According to FIG. 9, the server system 1000 includes an operation input section 102, an image display section 104, a sound output section 106, a communication section 108, a server processing section 200, and a server storage section 300.

The operation input section 102 outputs operation input signals to the server processing section 200 in accordance with various operation inputs for the management of the server system 1000. The operation input section 102 corresponds to the keyboard 1002 in FIG. 1.

The server processing section 200 controls input/output of data between the functional sections including the operation input section 102 and the server storage section 300. The server processing section 200 is implemented, for example, by a processor such as a CPU or a GPU and electronic components including ASIC and an IC memory. The server processing section 200 performs various calculation processes based on predetermined programs and data, operation input signals from the operation input section 102, data received from the player terminal 1500, or the like to entirely control the operations of the server system 1000. The server processing section 200 corresponds to the control board 1020 in FIG. 1. The server processing section 200 includes a player management section 202, a game management section 210, a timer section 240, an image generation section 234, a sound generation section 236, and a communication control section 238. It is clear that other kinds of function may also be included as appropriate.

The player management section 202 performs various processes concerning the registration management of the players. In the present embodiment, the player management section 202 has functions of assigning a unique player account to a registered player, managing registered information by registering and managing personal information for each player account, and managing game data. It is clear that other management functions of data associated with the account may also be included as appropriate. The player management section 202 manages data regarding each player 3 by assigning a unique account (player ID) to the player 3 who has completed player registration procedures and generating player management data 310.

Figure 10:
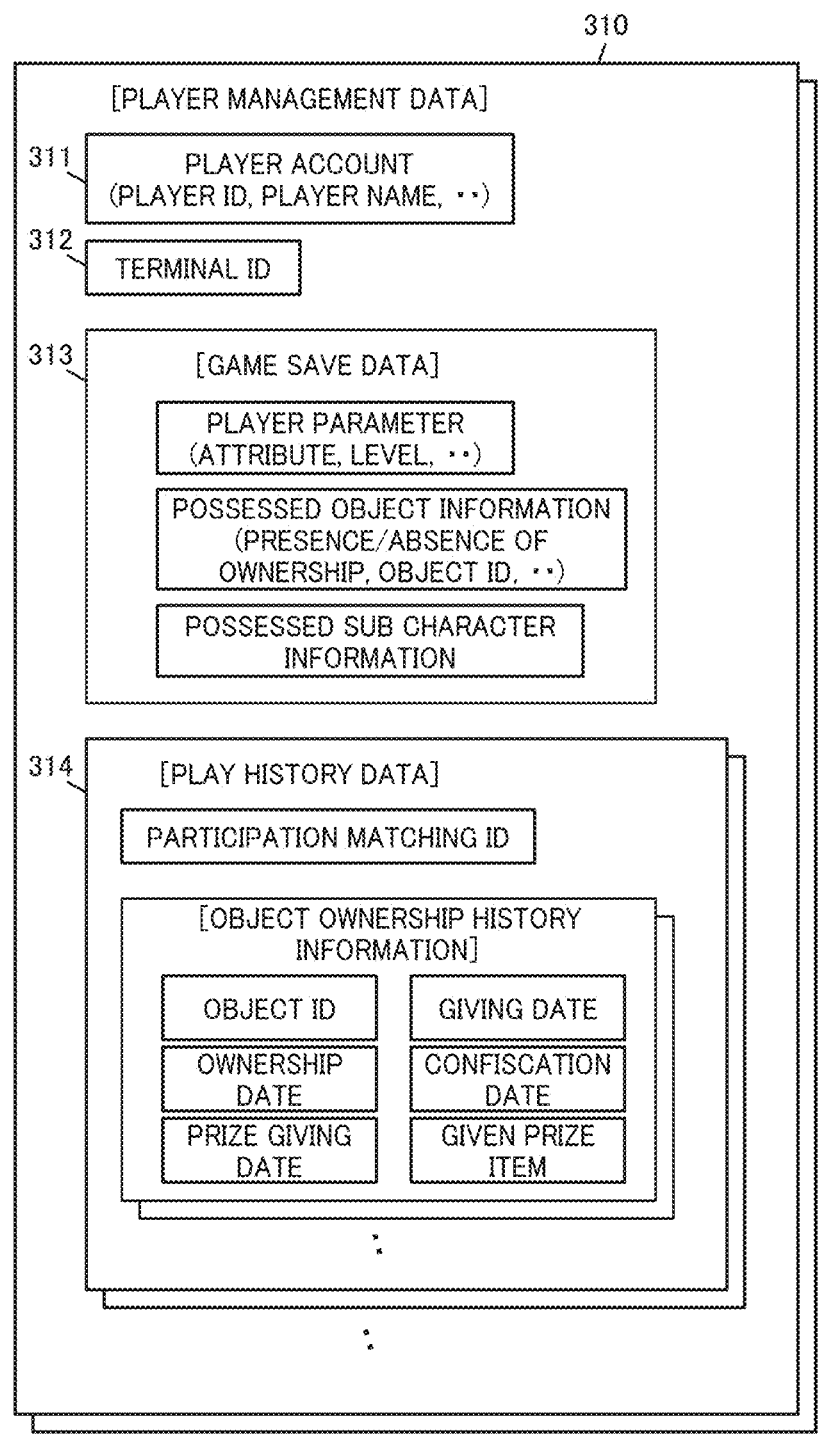
FIG. 10 is an example of player management data.

FIG. 10 is a diagram illustrating an example of the player management data 310. According to FIG. 10, the player management data 310 is generated for each of the registered players, and includes a player account 311 assigned to the player, a terminal ID 312 of the player terminal 1500 of the player, game save data 313, and play history data 314. The player account 311 includes a unique player ID assigned to the player, as well as a player name and a password arbitrarily set by the player. The game save data 313 includes player parameters including attributes and levels, possessed object information including presence or absence of possessed objects and objects ID of the possessed objects, and possessed sub character information regarding the sub character that was given as a prize and currently owned. The play history data 314 is generated for each gameplay the player joined, and includes a matching ID joined during the gameplay and object ownership history information. The object ownership history information is generated for each object obtained in the gameplay, and includes an object ID of the object, the giving date/time in the case where the object is given as the game condition is satisfied, the date/time of start of the ownership in the case where the object is obtained as a result of victory in a competition with the owner player, the date/time of confiscation in the case where the object is confiscated as the confiscation condition is satisfied, and the date/time of giving a prize in the case where a prize is given as the prize giving condition is satisfied, together with the content of the prize item.

The game management section 210 performs various processes concerning execution management of the game. Since the game according to the present embodiment is a client-server online game, the game management section 210 controls provision of data required for the gameplay while communicating with the player terminal 1500. The game management section 210 includes an object giving section 212, a prize giving section 214, a confiscation control section 218, a prize item presentation control section 222, a condition control section 224, a condition presentation section 226, and a matching control section 228.

The object giving section 212 gives an object to a player who has satisfied a given game condition. Specifically, the object giving section 212 gives one of the multiple types of eggs prepared as objects in advance to a player who has satisfied a game condition. The object is defined by the object initial setting information 320.

Figure 11:
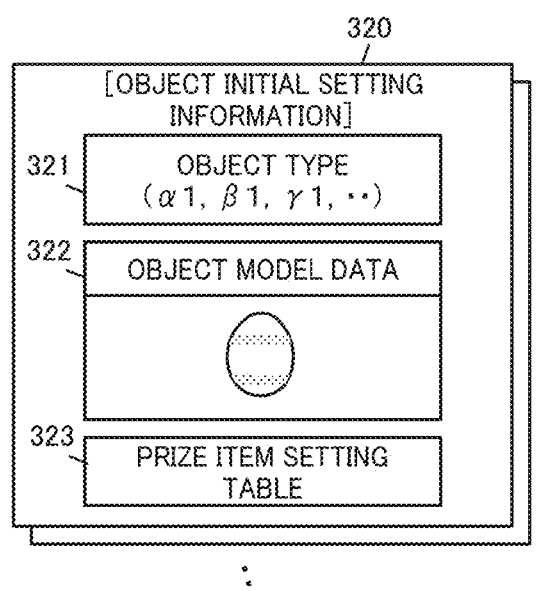
FIG. 11 is an example of object initial setting information.

FIG. 11 is an example of the object initial setting information 320. According to FIG. 11, the object initial setting information 320 defines model data 322 of the object and the prize item setting table 323 while associating them with each other for each type 321 of the egg as the object.

Also, the data regarding the object given to the player 3 by the object giving section 212 is managed by the object management data 340.

Figure 12:
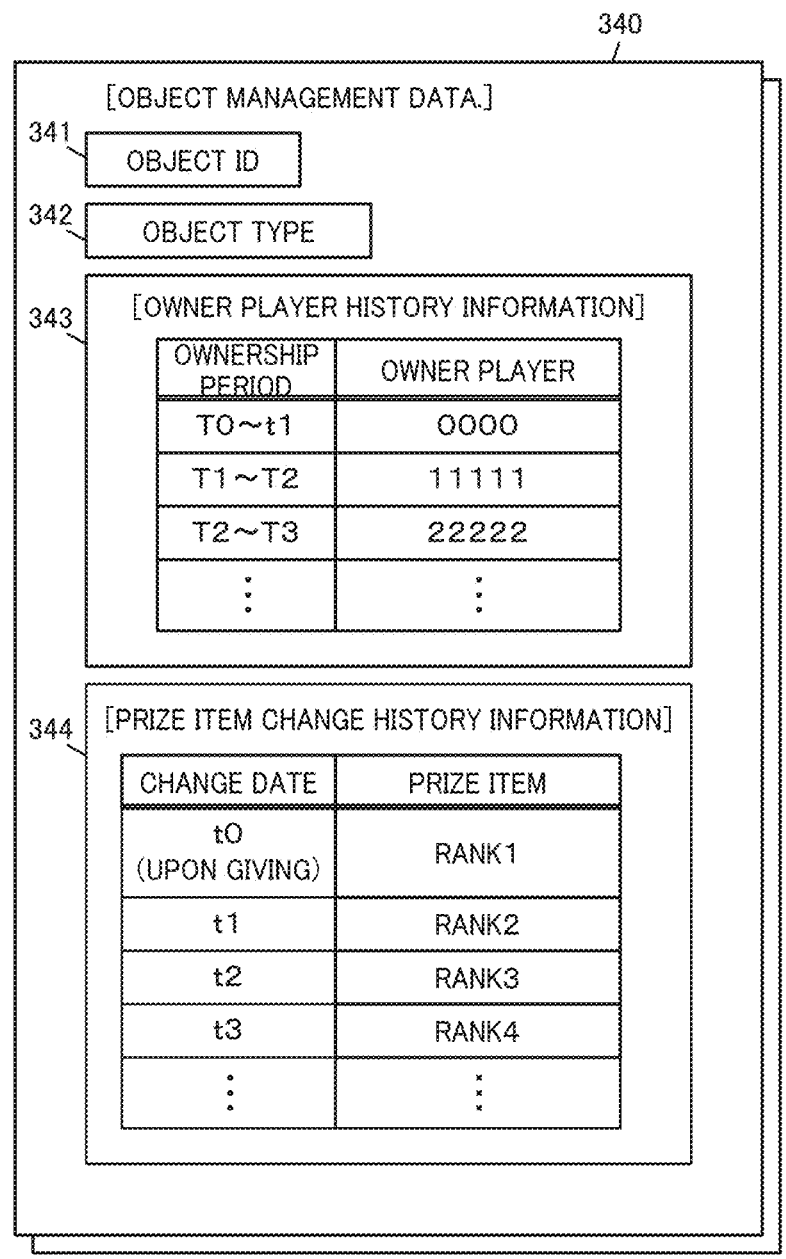
FIG. 12 is an example of object management data.

FIG. 12 is an example of the object management data 340. According to FIG. 12, the object management data 340 is generated for each of the given objects, and includes a unique object ID 341 assigned to the object, the egg type (object type) 342 of the egg as the object, owner player history information 343, and prize item change history information 344. The owner player history information 343 is a history of the owner player who obtained the object, and stores the period of ownership and the owner player in a chronological order while associating them with each other. The prize item change history information 344 is a history of the prize item that could be given to the owner player of the object (the history of the change of the prize item until it is actually given), and stores a date/time of the change of the prize item and a content of the prize item after the change in a chronological order while associating them with each other.

The prize giving section 214 gives a given prize to an owner player who is a player having the object when the owner player has satisfied a given prize giving condition. Specifically, the prize giving section 214 gives the sub character associated with the egg type, which is an object owned by the owner player, to the player as a prize. The prize corresponding to the object is defined in the prize item setting table 323 of the corresponding object initial setting information 320. The prize giving condition may be, for example, a manual condition of the owner player, such as a predetermined instruction operation input by the owner player, or other conditions such as when the object ownership period exceeds a predetermined period, when the victory exceeds a predetermined number of consecutive wins, or when a predetermined item is used, and the like. The prize giving condition is defined in advance as the prize giving condition setting information 352.

The prize giving section 214 includes a prize item control section 216.

The prize item control section 216 variably controls the prize item to be given to the owner player, for example, based on the play history of the owner player while the confiscation condition is not satisfied. The play history includes the number of acts not satisfying the confiscation condition, the state of the act not satisfying the confiscation condition, the length of the period in which the confiscation condition was not satisfied, and the frequency of the act. More specifically, in accordance with the prize item setting table 323 which stores correspondence for the type of the egg as the object owned by the owner player, the appearance or the parameter value (such as a rank) of the sub character, which is the prize item, is changed based on the play history while the owner player owns the object. In addition, the play history may include the date/time when the prize giving condition is satisfied, and the prize item may be variably controlled based on the date/time when the prize giving condition is satisfied. For example, it is possible to give a special prize item only for the specified event period. In this case, the event period and the prize item to be given may be presented to the player in advance. Alternatively, the prize item may be variably determined in accordance with a day of the week, such as a weekday or a holiday, a time zone such as daytime or nighttime, or the like.

Further, the prize item control section 216 variably controls the prize item based on the parameter value of the owner player when an object is given by the object giving section 212 as the game condition is satisfied. More specifically, when the egg as the object is given to a player who has satisfied the game condition, the type of the egg to be given is determined based on the parameter of the player at that point in accordance with the giving object setting table 330. The game condition may be, for example, the frequency of participation in the game, the total game playing time, the number of wins in the competitions with other players, use of predetermined items, or the like, or may also be a condition on the game progress such as an act of discovering an object hidden in a predetermined position in the game space. In addition, it is possible to decide whether or not to give the object with a predetermined probability at the predetermined timing such as upon the victory of the competition. The game condition is set and stored in advance as game condition setting information 350.

FIG. 13 is an example of the giving object setting table 330. According to FIG. 13, the giving object setting table 330 defines the level, which is the parameter value of the player, and the type of the egg, which is an object to be given, while associating them with each other. In addition to the level, the parameter value of the player may also be an attribute (water, fire, wind, etc.) or an occupation. In this case, it is effective to associate them with a type of object or prize that is advantageous for the attribute or the occupation.

When an act between the owner player and another player satisfies the confiscation condition for confiscating an object from the owner player, the confiscation control section 218 confiscates the object from the owner player to thereby turn the owner player to a non-owner player, and turn another player to the new owner player. Specifically, in the case where a competition is performed as an act between the owner player and another player and the owner player is defeated by another player, the object is confiscated from the owner player, thereby turning the owner player to a non-owner player, and turning another player to the new owner player who now owns the object. At this time, a special effect in which another player takes away the object from the owner player, or the like is performed.

The confiscation control section 218 includes a prize giving time confiscation section 220.

When a prize is given by the prize giving section 214, the prize giving time confiscation section 220 confiscates the object from the owner player and turns the owner player to a non-owner player. More specifically, when the predetermined instruction operation input, which is one of the prize giving conditions, is performed by the owner player, a special effect in which the sub character as the prize appears from the inside the an egg when the egg (object) is broken, and the prize is given to the owner player; then the object is confiscated from the owner player to turn the owner player to a non-owner player.

The prize item presentation control section 222 performs control of the presentation of the prize item to the owner player. More specifically, it is possible to present a display in the form of, for example, a color or a pattern of the egg as the object in accordance with the appearance or the parameter value (such as a rank) of a subject of the prize item to be given at that point, thereby giving a clue of the item. Alternatively, the appearance of the sub character as the prize item to be given may be schematically displayed. This presentation may be performed at all times, or may be performed when a predetermined presentation condition is satisfied. The presentation condition may be, for example, a condition of performing a predetermined operation at a predetermined position in the game space, such as a condition in which, when the player goes to a secret spring and reflects an image of the egg on the surface of the spring, the sub character that is the content of the egg is presented, or a condition in which the content of the egg becomes visible when a predetermined item is used.

The condition control section 224 variably controls at least one of the game conditions, the prize giving condition, and the confiscation condition. More specifically, it is possible to prepare multiple types of conditions that are associated with each of the number and the level of participating players, the degree of difficulty of the game stage, and the like, in advance, and select and apply these conditions as the conditions for the matching before the battle royale game is performed.

The condition presentation section 226 performs control for presenting at least one of the game conditions, the prize giving condition, and the confiscation condition to players participating in the game. More specifically, the game condition, the prize giving condition, and the confiscation condition can be presented to the participating player as a rule of the game before the matching, before the start of the gameplay, or during the play.

The matching control section 228 performs matching of players participating in the game, and, when the participating player is the owner player, the matching control section 228 performs control for identifiable display of the owner player upon the matching so as to notify other players of the participation of the owner player; As the identifiable display of the owner player, for example, an icon indicating the owner player may be additionally displayed in the list of participating players that is to be displayed after the matching is completed and before the gameplay is started, or during the gameplay. The icon may also be additionally displayed in the player character of the owner player during the gameplay.

The timer section 240 uses a system clock to measure the current date/time, and the like.

The image generation section 234 generates an image related to the system management of the server system 1000, an image to be displayed on the player terminal 1500, and the like, and outputs an image signal related to the system management to the image display section 104. The image display section 104 displays various images for system management based on the image signals input from the image generation section 234. For example, the image display section 104 can be implemented by an image display device, such as a flat panel display, a projector, or the like. The image display section 104 corresponds to the display 1004 in FIG. 1.

The sound generation section 236 is implemented by execution of an IC or software for generating sound data and decoding, and generates or decodes sound data of operational sounds, BGM, and the like related to the system management of the server system 1000 or the gameplay. The sound generation section 236 outputs a sound signal related to the system management to the sound output section 106. The sound output section 106 emits sound based on the sound signal. The sound output section 106 corresponds to a speaker (not illustrated) included in the main body device 1010 or the display 1004 in FIG. 1.

The communication control section 238 executes data processing concerning the data communication, and performs data exchange with external devices via the communication section 108. The communication section 108 is connected to the communication network N to enable the communication. For example, the communication section 108 is implemented by a transceiver, a modem, a Terminal Adaptor (TA), a jack for wired communication cable, a control circuit, and the like. The communication section 108 corresponds to the communication device 1016 in FIG. 1.

The server storage section 300 stores programs and various types of data for implementing various functions for causing the server processing section 200 to entirely control the server system 1000. The server storage section 300 is also used as a work area for the server processing section 200, and temporarily stores results of calculations and the like executed by the server processing section 200 in accordance with various programs. This function is implemented by an IC memory such as a RAM or a ROM, a magnetic disc such as a hard disc, an optical disc such as a CD-ROM or a DVD, an online storage, or the like, for example. The server storage section 300 stores a server program 302 for implementing various functional sections of the server system 1000, a distribution client program 304, player management data 310, object initial setting information 320, a giving object setting table 330, object management data 340, game condition setting information 350, prize giving condition setting information 352, confiscation condition setting information 354, matching history information 360, and play data 370.

Figure 14:
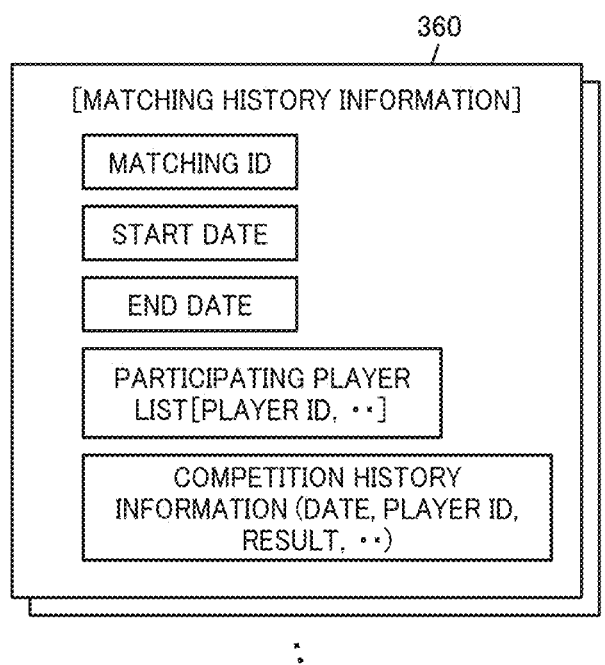
FIG. 14 is an example of matching history information.

The matching history information 360 is histories of participating players of the gameplay matched by the matching control section 228. FIG. 14 shows an example of matching history information 360. According to FIG. 14, the matching history information 360 includes a unique matching ID assigned to the matching, the start and end dates and times of the corresponding gameplay, a list of participating players, and competition history information. The competition history information is the history of competitions performed in the gameplay, and stores the date and time of the competition, the player IDs of the players who joined the competition, and the results of the competition in a chronological order for each competition.

Figure 15:
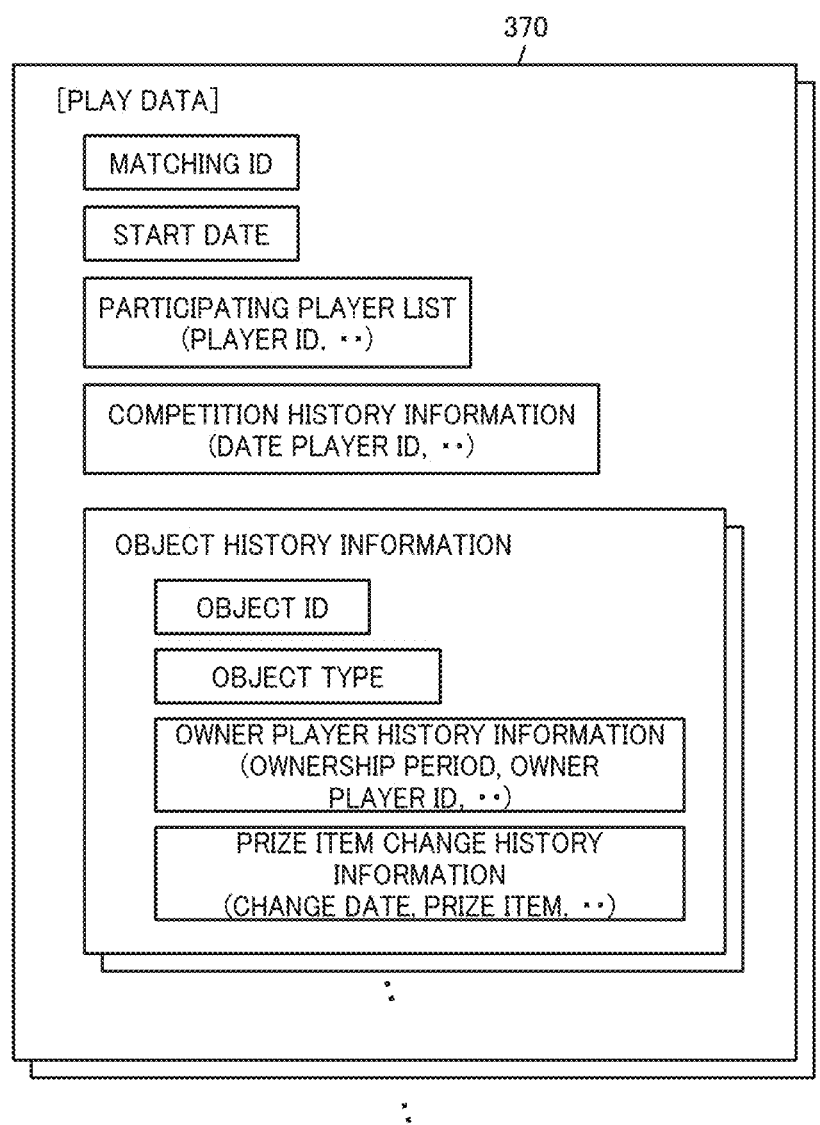
FIG. 15 is an example of play data.

The play data 370 is data regarding the gameplay currently performed. FIG. 15 is an example of the play data 370. According to FIG. 15, the play data 370 is generated for each gameplay, and includes matching ID of the players participating in the gameplay, the game start date and time, competition history information, and object history information. The object history information is data related to an object obtained by a participating player in the gameplay, and is generated for each object. The object history information includes an object ID of the object, the type of the egg as the object, owner player history information, and prize item change history information. The owner player history information is a history of a participating player who has become the owner player of the object as a result of the gameplay, and stores an ownership period and an owner player in a chronological order while associating them with each other. The prize item change history information is a history of the prize items that can be given to the owner player of the object in the gameplay, and stores the date and time of the prize item change and the content of the changed prize item in a chronological order while associating them with each other.

2. Player Terminal

Figure 16:
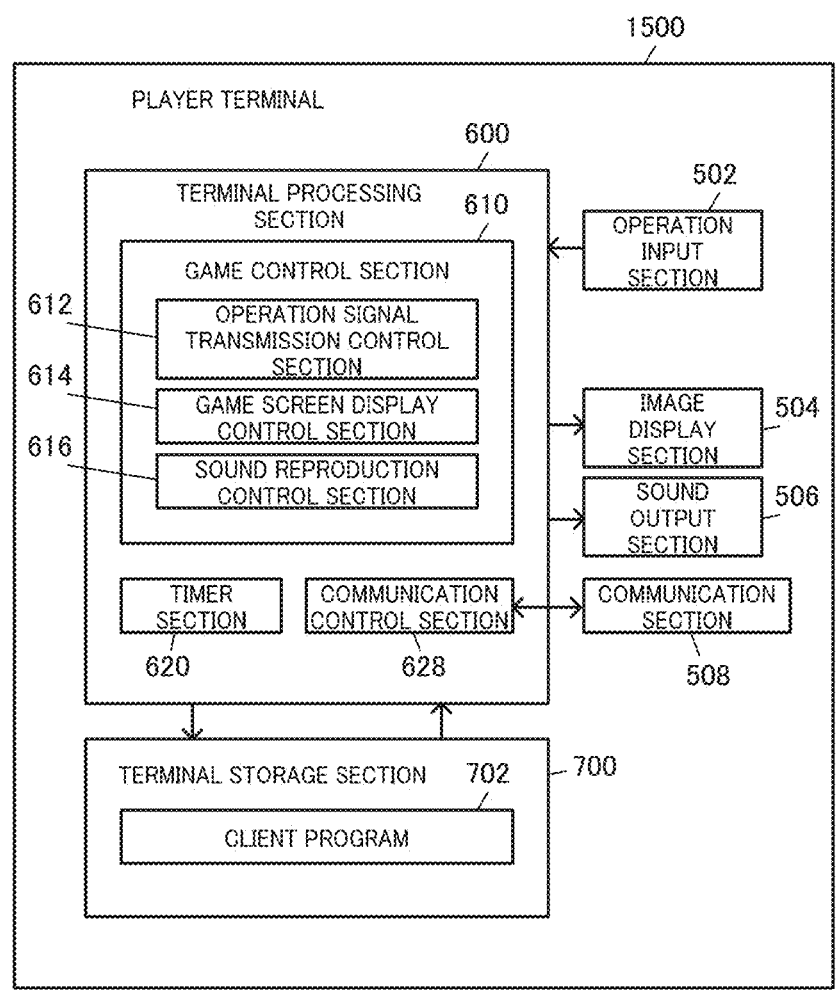
FIG. 16 is a diagram illustrating a functional structure of a player terminal.

FIG. 16 is a block diagram illustrating an example of functional configuration of the player terminal 1500. According to FIG. 16, the player terminal 1500 includes an operation input section 502, an image display section 504, a sound output section 506, a communication section 508, a terminal processing section 600, and a terminal storage section 700.

The operation input section 502 outputs operation input signals to the terminal processing section 600 in accordance with various operation inputs by the player 3. For example, the operation input section 502 can be implemented by a push switch, joystick, touch pad, trackball, acceleration sensor, gyro, CCD module, or the like.

The terminal processing section 600 controls input/output of data between the functional sections including the operation input section 502 and the terminal storage section 700. The terminal processing section 600 is implemented, for example, by a processor and electronic components including an IC memory. The processor includes, for example, a centralized arithmetic unit such as CPU or GPU, and other arithmetic circuits such as ASIC and FPGA. The terminal processing section 600 performs various calculation processes based on predetermined programs and data, operation signals from the operation input section 502, data received from the server system 1000, or the like to control the operations of the player terminal 1500. The terminal processing section 600 includes a game control section 610, a timer section 620, and a communication control section 628.

The game control section 610 includes an operation signal transmission control section 612, a game screen display control section 614, and a sound reproduction control section 616.

The operation signal transmission control section 612 performs a process of transmitting various types of data and requests to the server system 1000 in accordance with an operation performed on the operation input section 502.

The game screen display control section 614 performs control for displaying a game screen based on the various types of image data received from the server system 1000. For example, the game screen display control section 614 is implemented by a processor such as CPU or a Digital Signal Processor (DSP), a program such as video signal IC or video codec, a rendering frame IC memory such as a frame buffer, and the like, and generates an image of 1 game screen in 1 frame time (for example, ⅟60 second) based on various types of data received from server system 1000 and outputs the image signal of the generated game screen to the image display section 504. Although the game screen images are generated in the server system 1000 in the present embodiment, it is also possible to generate them in the player terminal 1500.

The image display section 504 displays various game images based on the image signals input from the game screen display control section 614. For example, the image display section 504 can be implemented by an image display device, such as a flat panel display, a projector, or a head-mounted display.

The sound reproduction control section 616 performs control for emitting a game voice (for example, sound effect, BGM, lines read by voice actors, and the like) based on various types of sound data received from the server system 1000. The sound reproduction control section 616 is implemented, for example, by a processor such as a Digital Signal Processor (DSP) or a sound synthesizing IC, or an audio codec or the like for playing a sound file, and generates sound signals of various types of game sounds such as sound effects, BGM, various types of operational sounds, lines read by voice actors, and the like, and outputs the generated signals to the sound output section 506.

The sound output section 506 outputs the sound effects, BGM, and the like, based on the sound signals input from the sound reproduction control section 616.

The communication control section 628 executes data processing concerning the data communication, and performs data exchange with external devices via the communication section 508. For example, the communication section 108 is implemented by a transceiver, a modem, a Terminal Adaptor (TA), a jack for wired communication cable, a control circuit, and the like.

The timer section 620 uses a system clock to measure the current date/time, and the like.

The terminal storage section 700 stores a system program for implementing various functions for causing the terminal processing section 600 to entirely control the player terminal 1500, as well as programs and various types of data required for the gameplay. The terminal storage section 700 is also used as a work area for the terminal processing section 600, and temporarily stores results of calculations executed by the terminal processing section 600 in accordance with various programs, input data from the operation input section 502, or the like. This function is implemented by an IC memory such as a RAM or a ROM, a magnetic disc such as a hard disc, an optical disc such as a CD-ROM or a DVD, or the like, for example. In the present embodiment, the terminal storage section 700 stores a client program 702.

The client program 702 is application software for implementing the function of the game control section 610 by being read and executed by the terminal processing section 600. In the present embodiment, the client program 702 is a copy of the distribution client program 304 (see FIG. 9) provided by the server system 1000. The client program 702 may be a dedicated client program or may be configured by a web browser program or a plug-in or the like that performs an interactive image display, depending on the technical method for performing the game.

The Flow of Processing

Figure 17:
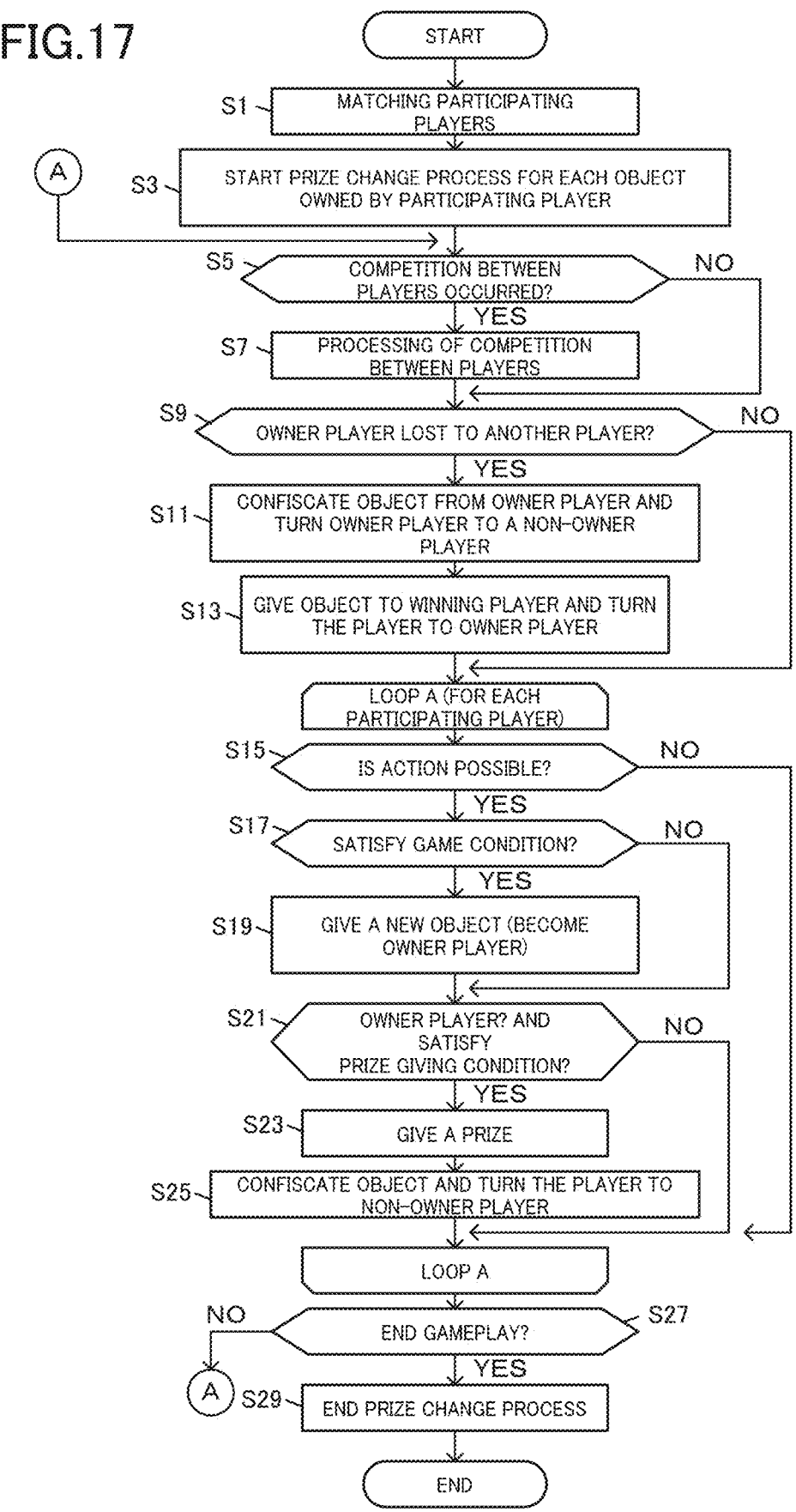
FIG. 17 is a flowchart of a game control process.

FIG. 17 is a flowchart for describing a flow of game process. This process relates to a single round of gameplay executed by the game management section 210.

First, the matching control section 228 performs matching of participating players (step S1). Next, the prize item control section 216 starts a prize change process for each of the objects owned by the participating players at the start of the gameplay (step S3). Specifically, the prize item control section 216 performs change control with respect to prize items that can be given to an owner player in accordance with the prize item setting table 323 corresponding to the type of each object. Then, the gameplay is started, and if a competition occurs between the participating players during the gameplay (step S5: YES), a competition process between these participating players is performed in accordance with operation instructions given by each of the participating players (step S7). If the owner player is defeated by another player as a result of the competition (step S9: YES), the confiscation control section 218 confiscates the object from the defeated owner player and turns the owner player to a non-owner player (step S11). Further, the object is given to another player who wins the competition, and this player becomes a new owner player (step S13).

Subsequently, a repetitive process (loop A) is performed for each participating player. First, it is determined whether or not the target participating player (target player) is in an active state in which he/she can make an action. If the target participating player is in an active state (step S15: YES), the object giving section 212 determines whether or not the target player satisfies the game condition. If the game condition is satisfied (step S17: YES), the object giving section 212 gives a new object to the target player and turn this player to an owner player (step S19). The object thus given is added to the target of the prize change process.

Further, the prize giving section 214 determines whether the target player is an owner player and whether he/she satisfies the prize giving condition. If the target player is an owner player and satisfies the prize giving condition (step S21: YES), the prize giving section 214 gives a prize corresponding to the object owned by the target player (step S23). Then, the prize giving time confiscation section 220 confiscates the object owned by the target player and turns the player to a non-owner player (step S25). The sequence of these processes is the repetitive process (loop A).

After the repetitive process is done for all participating players, it is determined whether the game end condition is satisfied and if the gameplay will end. If it is determined that the game will not end (step S27: NO), the process returns to step S5. If the gameplay will end (step S27: YES), the prize change process performed by the prize item control section 216 is ended (step S29).

Advantageous Effects

As described above, according to the present embodiment, it is possible to further enhance amusement of games in which multiple players participate. More specifically, if the owner player of the egg 10, which is the object, lost the competition between the owner player and another player, the object is confiscated from the owner player and another player becomes a new owner player. As a result, it is possible to achieve a new technology that can enhance amusement of game, such as a competition between players fighting for objects. In addition, the prize item given to the owner player when the owner player satisfies the prize giving condition is variably controlled based on the play history, such as the number of competitions (number of wins), the state of competition, the ownership period length, the frequency of competition (frequency of win) and the like during the ownership period. This will give the players excitement by making them guess what kind of prize will be given, thereby further enhancing amusement of the game.

Modification Example

It should be noted that the applicable embodiment of the present disclosure is not limited to the above-mentioned embodiment, but of course, it can be changed as appropriate without departing from the purpose of the present disclosure.

(A) Confiscation Condition

In the embodiment described above, the confiscation condition is defeat by another player in a competition; however, other conditions may also be used. For example, the condition may be a predetermined number (for example, twice) or more of consecutive defeats by another player in competitions.

(B) Change of Ownership of Object (Transition of Ownership)

The above embodiment is arranged such that, if the owner player loses to another player in a competition, the object confiscated from the owner player will be transferred to the winner, and that the another player, who is the winner, will become a new owner player. However, it may be arranged such that, after the object of the owner player is confiscated, there is no owner of the object (ownership terminates) or the object may be erased. Further, when the ownership is transferred to another player who won the competition (ownership is transferred), it may be arranged such that, when the object is confiscated from the player who was the owner player until just before, the object is temporarily owned by nobody, and that the object is then transferred (ownership is transferred) to the winning player after a certain time elapsed.

(C) Obtain Another Object

The above embodiment is arranged such that, if the owner player loses to another player in a competition, the object confiscated from the owner player will be transferred to the winner, and that the another player, who is the winner, will become a new owner player. Alternatively, it may be arranged such that the winning player obtains a new different object instead of the object confiscated from the previous owner player defeated by the winning player. In this case, it may be arranged such that the object confiscated from the player who was the owner player until just before may disappear, or may be temporarily not owned by anyone; then, it is given to, for example, a player who satisfies a given condition such as a game condition.

(D) Give a Prize Upon Confiscation

It is also possible to regard satisfying a confiscation condition as satisfying a prize giving condition, and give a prize when the confiscation condition is satisfied. More specifically, when the owner player is defeated by another player in a competition and the egg 10 as the object is confiscated, some kind of prize is given for the previous ownership of the object. The prize to be given is determined based on the play history of the owner player at the end of the competition.

(E) Confiscation of Object Upon Prize Giving

Although the above embodiment is arranged such that the object of the owner player is confiscated when the owner player satisfies the prize giving condition and a prize is given, it may also be arranged such that the object is not confiscated, or that the object is confiscated when a prize is given predetermined times. In this case where the owner player is given a prize but the object is not confiscated from him/her when the prize giving condition is satisfied, it is possible to reset the change control of prize item, or it is also possible not to reset and continue the change control of prize item.

(F) Prize Item Change Control

In the above embodiment, the change control of prize item to be given to the owner player of the object is performed in accordance with the prize item setting table 323 (see FIG. 6 to FIG. 8) based on a play history during a period in which the owner player owns the object. Specifically, if the object of the owner player is confiscated and another player who beat the owner player in the competition obtains the object and becomes a new owner player, the change control of prize item is reset at that point. This may be altered such that the change control of prize item at the time of confiscation is taken over. More specifically, it may be arranged such that each prize item associated with a play history in the prize item setting table 323 is subjected to a relative change based on the prize item at the time when the player becomes the owner player.

(G) Game Type

The game to which the present disclosure can be applied is not limited to the battle royale game described in the embodiment above, but may be any game in which a plurality of players participates. The act that satisfies the confiscation condition may be appropriately defined in accordance with the type of game.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer system comprising: at least one processor or circuit programmed to:
    store, in advance, a plurality of object initial setting information defining a plurality of objects;
    responsive to a player of a plurality of registered players being determined to satisfy a given game condition, register an object of the plurality of objects as being given to and possessed by the player, as an owner player, and determine a given prize associated with the object possessed by the owner player;
    register, in player management data, at least during game play, a play history for the plurality of registered players;
    while the owner player possesses the object, perform change control to change a prize item of the given prize to be more advantageous to the owner player in a competition game based on the play history of the owner player;
    when the owner player has satisfied a given prize giving condition, register the given prize associated with the object as being given to and possessed by the owner the owner player possessing the object; and
    when an act during the game play between the owner player and another player of the plurality of registered players satisfies a confiscation condition, confiscate the object from the owner player, and register the object as being given to and possessed by the another player as a new owner player of the object.

2. The computer system as defined in claim 1, wherein giving the prize comprises variably controlling a prize item to be given to the owner player.

3. The computer system as defined in claim 2, wherein controlling the prize item comprises variably controlling the prize item based on a play history of the owner player while the confiscation condition is not satisfied.

4. The computer system as defined in claim 3, wherein the play history includes a number of acts performed between the owner player and at least one of the plurality of registered players not satisfying the confiscation condition.

5. The computer system as defined in claim 3, wherein the play history includes a state of the act when the act does not satisfy the confiscation condition.

6. The computer system as defined in claim 3, wherein the play history includes a length of a period in which the confiscation condition is not satisfied.

7. The computer system as defined in claim 3, wherein the play history includes frequency of the act.

8. The computer system as defined in claim 2, wherein controlling the prize item includes variably controlling the prize item based on a parameter value of the owner player at the time of the object being given after the game condition is satisfied.

9. The computer system as defined in claim 2, wherein the at least one processor or circuit is further programmed to
reset change control for the prize item when the prize is given to the owner player after the prize giving condition is satisfied.

10. The computer system as defined in claim 2, wherein giving the prize comprises giving the prize by regarding satisfying the confiscation condition as satisfying the prize giving condition.

11. The computer system as defined in claim 10, wherein controlling the prize item comprises variably controlling the prize item based on a parameter value of the owner player and/or a parameter value of the another player at the time of the act satisfying the confiscation condition.

12. The computer system as defined in claim 2, wherein confiscating comprises confiscating the object from the owner player and registering the owner player as a non-owner player when the prize is given.

13. The computer system as defined in claim 2, wherein the at least one processor or circuit is further programmed to
perform a control for presenting the prize item to the owner player.

14. The computer system as defined in claim 1, wherein the at least one processor or circuit is further programmed to
control at least one of the game conditions, the prize giving condition, and the confiscation condition.

15. The computer system as defined in claim 1, wherein the at least one processor or circuit is further programmed to
control presenting at least one of the game conditions, the prize giving condition, and the confiscation condition to players among the registered players, participating in the game.

16. The computer system as defined in claim 1, wherein the at least one processor or circuit is further programmed to control matching of players among the registered players, including the player, participating in the game; and when the participating players that are matched include the owner player, control to identifiably indicate the owner player.

17. A server system for performing communication with player terminals, comprising:

at least one processor or circuit programmed to:

store, in advance, a plurality of object initial setting information defining a plurality of objects;

responsive to a player of a plurality of registered players being determined to satisfy a given game condition, register an object of the plurality of objects as being given to and possessed by the player, as an owner player, and determine a given prize associated with the object possessed by the owner player;

register, in player management data, at least during game play, a play history for the plurality of registered players;

while the owner player possesses the object, perform change control to change a prize item of the given prize to be more advantageous to the owner player in a competition game based on the play history of the owner player;

when the owner player has satisfied a given prize giving condition, register the given prize associated with the object as being given to and possessed by the owner player possessing the object; and when an act during the game play between the owner player and another player of the plurality of registered players satisfies a confiscation condition, confiscate the object from the owner player, and register the object as being given to and possessed by the another player as a new owner player of the object.

18. A game system comprising:

a player terminal; and a server system for performing communication with the player terminal, the server system including:

at least one processor or circuit programmed to:

store, in advance, a plurality of object initial setting information defining a plurality of objects;

responsive to a player of a plurality of registered players being determined to satisfy a given game condition, register an object of the plurality of objects as being given to and possessed by the player, as an owner player, and determine a given prize associated with the object possessed by the owner player;

register, in player management data, at least during game play, a play history for the plurality of registered players;

while the owner player possesses the object, perform change control to change a prize item of the given prize to be more advantageous to the owner player in a competition game based on the play history of the owner player;

when the owner player has satisfied a given prize giving condition, register the given prize associated with the object as being given to and possessed by the owner player possessing the object; and when an act during the game play between the owner player and another player of the plurality of registered players satisfies a confiscation condition, confiscate the object from the owner player, and register the object as being given to and possessed by the another player as a new owner player of the object.

* * * * *